US012553979B2

(12) United States Patent
Harrebek et al.

(10) Patent No.: US 12,553,979 B2
(45) Date of Patent: Feb. 17, 2026

(54) COMPENSATING FOR DYNAMIC ANTENNA ARRAY PHASE DEVIATION

(71) Applicant: NOKIA TECHNOLOGIES OY, Espoo (FI)

(72) Inventors: Johannes Harrebek, Aalborg (DK); Oana-Elena Barbu, Aalborg (DK); Benny Vejlgaard, Gistrup (DK); Simon Svendsen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 321 days.

(21) Appl. No.: 18/247,378

(22) PCT Filed: Sep. 23, 2021

(86) PCT No.: PCT/FI2021/050625
§ 371 (c)(1),
(2) Date: Mar. 30, 2023

(87) PCT Pub. No.: WO2022/069793
PCT Pub. Date: Apr. 7, 2022

(65) Prior Publication Data
US 2025/0271533 A1   Aug. 28, 2025

(30) Foreign Application Priority Data

Sep. 30, 2020   (FI) .................................. 20205950

(51) Int. Cl.
*G01S 5/02* (2010.01)
*H01Q 3/36* (2006.01)
(52) U.S. Cl.
CPC ............... *G01S 5/021* (2013.01); *H01Q 3/36* (2013.01)
(58) Field of Classification Search
CPC ................................... G01S 5/21; H01Q 3/36
(Continued)

(56) References Cited

U.S. PATENT DOCUMENTS 10,651,920 B1   5/2020   Struhsaker et al.
2008/0129613 A1   6/2008   Ermutlu et al.
(Continued)

FOREIGN PATENT DOCUMENTS

CN   102323489 A   1/2012
CN   102830406 A   12/2012
(Continued)

OTHER PUBLICATIONS

Akrour et al., "Calibrating Antenna Phase Centers: A Tale of Two Methods", GPS World, (Feb. 2005), 5 pages.
(Continued)

*Primary Examiner* — Harry K Liu
(74) *Attorney, Agent, or Firm* — ALSTON & BIRD LLP

(57) ABSTRACT

A method comprising receiving a positioning reference signal request, determining positioning requirements associated with the received positioning reference signal request, determining capabilities of a terminal device, determining an antenna array radiation pattern beam width for a position reference signal based, at least partly on the determined positioning requirements and the determined capabilities of the terminal device, obtaining a value for a compensation parameter based on the determined antenna array radiation pattern beam width, performing beam steering towards a target access node, and performing a timing compensation using the compensation parameter with the obtained value.

20 Claims, 14 Drawing Sheets

(58) Field of Classification Search
USPC .......................................................... 342/451
See application file for complete search history.

(56) References Cited

U.S. PATENT DOCUMENTS

| | | |
|---|---|---|
| 2010/0123624 A1 | 5/2010 | Minear et al. |
| 2010/0311457 A1 | 12/2010 | Johansson et al. |
| 2011/0249718 A1 | 10/2011 | Zerbe |
| 2013/0241768 A1 | 9/2013 | Petersen |
| 2015/0326297 A1 | 11/2015 | Petersson et al. |
| 2015/0369924 A1 | 12/2015 | Hedgecock et al. |
| 2016/0127023 A1 | 5/2016 | Athley et al. |
| 2019/0280785 A1 | 9/2019 | Petersson et al. |
| 2019/0380056 A1 | 12/2019 | Lee et al. |
| 2020/0119443 A1 | 4/2020 | Leather et al. |
| 2020/0137714 A1 | 4/2020 | Kumar et al. |
| 2020/0145084 A1 | 5/2020 | Yan et al. |
| 2022/0346000 A1* | 10/2022 | Baek ..................... H04W 48/16 |

FOREIGN PATENT DOCUMENTS

| | | | | |
|---|---|---|---|---|
| CN | 104502926 A | 4/2015 | | |
| CN | 111381112 A | 7/2020 | | |
| EP | 3454074 A1 * | 3/2019 | ............. | H04W 4/02 |
| EP | 3521842 A1 | 8/2019 | | |
| WO | WO-2015145217 A1 * | 10/2015 | ............ | H04W 64/00 |
| WO | WO 2020/089276 A1 | 5/2020 | | |
| WO | WO 2020/091645 A1 | 5/2020 | | |

OTHER PUBLICATIONS

Almasri et al., "Determination of the Phase Centers of Multi-Mode Antennas", arXiv:2001.10216v1, (Jan. 28, 2020), 5 pages.
Ericsson, "Introduction of NR Positioning Support", 3GPP TSG-RAN WG1 Meeting #99, Change Request CR 0029, R1-1913661, (Nov. 18-22, 2019), 11 pages.
Extended European Search Report for European Application No. 21874642.8 dated Feb. 8, 2024, 6 pages.
First Examination Report for Indian Application No. 202347029101 dated Feb. 26, 2024, 7 pages.
Gröschel et al., "A System Concept for Online Calibration of Massive MIMO Transceiver Arrays for Communication and Localization", IEEE Transactions on Microwave Theory and Techniques, vol. 65, No. 5, (May 2017), 16 pages.
Intel Corporation et al., "New WID: NR Positioning Support", 3GPP TSG RAN Meeting #83, RP-190752, (Mar. 18-21, 2019), 6 pages.
International Search Report and Written Opinion for Patent Cooperation Treaty Application No. PCT/FI2021/050625 dated Dec. 23, 2021, 20 pages.
Kunysz, W., "Antenna phase center effects and measurements in GNSS ranging applications", 2010 14th International Symposium on Antenna Technology and Applied Electromagnetics & the American Electromagnetics Conference, (Jul. 5, 2010), 4 pages.
Li et al., "GNSS antenna phase center and group delay evaluating", 2015 IEEE 4th Asia-Pacific Conference on Antennas and Propagation (APCAP), (Jun. 2015), 2 pages.
Moheb et al., "Phase centre analysis of array antennas and its significance for microwave landing system", 1991 Seventh International Conference on Antennas and Propagation, ICAP 91 (IEE), (Apr. 1991), 4 pages.
Office Action for Finland Application No. 20205950 dated Jan. 21, 2022, 1 page.
Office Action for Finland Application No. 20205950 dated May 26, 2021, 10 pages.
Qualcomm Incorporated, "New SID on NR Positioning Enhancements", 3GPP TSG RAN Meeting #86, RP-193237, (Dec. 9-12, 2019), 4 pages.
Yashchyshyn et al., "Evaluation of the impact of the virtual phase centre effect on the accuracy of the positioning system", 2009 3rd European Conference on Antennas and Propagation, (Jun. 5, 2009), 4 pages.

* cited by examiner

416
414
FIG. 4
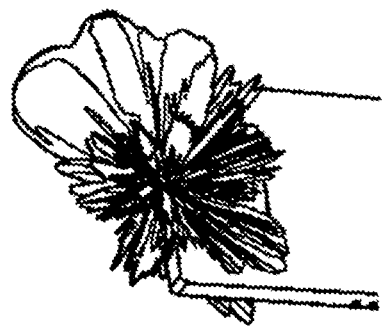
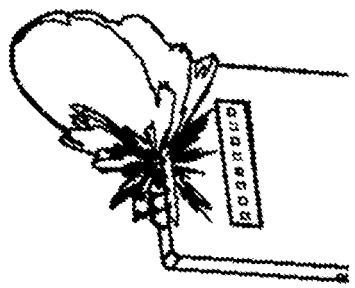
412
422  424

//COMPENSATING FOR DYNAMIC ANTENNA ARRAY PHASE DEVIATION

CROSS-REFERENCE TO RELATED APPLICATIONS

This application is a national phase entry of International Application No. PCT/FI2021/050625, filed Sep. 23, 2021, which claims priority to Finnish Application No. 20205950, filed Sep. 30, 2020, the contents of which are hereby incorporated by reference in their entirety.

FIELD

The following exemplary embodiments relate to dynamic antenna arrays and compensating for a phase deviation of a dynamic antenna array.

BACKGROUND

A terminal device may comprise an antenna array. The terminal device may further be capable of receiving and transmitting data to one or more access nodes comprised in a wireless communication system. The wireless communication system may be capable of obtaining a location of the terminal device based, at least partly, on the one or more access nodes.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to an aspect there is provided an apparatus comprising means for receiving a positioning reference signal request, determining positioning requirements associated with the received positioning reference signal request, determining capabilities of a terminal device, determining an antenna array radiation pattern beam width for a position reference signal based, at least partly on the determined positioning requirements and the determined capabilities of the terminal device, obtaining a value for a compensation parameter based on the determined antenna array radiation pattern beam width, performing beam steering towards a target access node, and performing a timing compensation using the compensation parameter with the obtained value.

According to another aspect there is provided an apparatus comprising means for configuring an antenna array of a terminal device placed in an anechoic chamber for a beam index, obtaining measurement of the radiation pattern produced by the terminal device, determining, based on the obtained measurement, a value for at least one compensation parameter for a full active area of the beam, determining, based on the obtained measurement, another value for the at least one compensation parameter for at least one sub-area of the active area of the beam, and providing the determined values for storing to terminal device being produced.

According to another aspect there is provided an apparatus comprising at least one processor, and at least one memory including a computer program code, wherein the at least one memory and the computer program code are configured, with the at least one processor, to cause the apparatus to: receive a positioning reference signal request, determine positioning requirements associated with the received positioning reference signal request, determine capabilities of a terminal device, determine an antenna array radiation pattern beam width for a position reference signal based, at least partly on the determined positioning requirements and the determined capabilities of the terminal device, obtain a value for a compensation parameter based on the determined antenna array radiation pattern beam width, perform beam steering towards a target access node, and perform a timing compensation using the compensation parameter with the obtained value.

According to another aspect there is provided an apparatus comprising at least one processor, and at least one memory including a computer program code, wherein the at least one memory and the computer program code are configured, with the at least one processor, to cause the apparatus to configure an antenna array of a terminal device placed in an anechoic chamber for a beam index, obtain measurement of the radiation pattern produced by the terminal device, determine, based on the obtained measurement, a value for at least one compensation parameter for a full active area of the beam, determine, based on the obtained measurement, another value for the at least one compensation parameter for at least one sub-area of the active area of the beam, and provide the determined values for storing to terminal device being produced.

According to another aspect there is provided a method comprising receiving a positioning reference signal request, determining positioning requirements associated with the received positioning reference signal request, determining capabilities of a terminal device, determining an antenna array radiation pattern beam width for a position reference signal based, at least partly on the determined positioning requirements and the determined capabilities of the terminal device, obtaining a value for a compensation parameter based on the determined antenna array radiation pattern beam width, performing beam steering towards a target access node, and performing a timing compensation using the compensation parameter with the obtained value.

According to another aspect there is provided a method comprising configuring an antenna array of a terminal device placed in an anechoic chamber for a beam index, obtaining measurement of the radiation pattern produced by the terminal device, determining, based on the obtained measurement, a value for at least one compensation parameter for a full active area of the beam, determining, based on the obtained measurement, another value for the at least one compensation parameter for at least one sub-area of the active area of the beam, and providing the determined values for storing to terminal device being produced.

According to another aspect there is provided a computer program product readable by a computer and, when executed by the computer, configured to cause the computer to execute a computer process comprising receiving a positioning reference signal request, determining positioning requirements associated with the received positioning reference signal request, determining capabilities of a terminal device, determining an antenna array radiation pattern beam width for a position reference signal based, at least partly on the determined positioning requirements and the determined capabilities of the terminal device, obtaining a value for a compensation parameter based on the determined antenna array radiation pattern beam width, performing beam steering towards a target access node, and performing a timing compensation using the compensation parameter with the obtained value.

According to another aspect there is provided a computer program product readable by a computer and, when executed by the computer, configured to cause the computer to execute a computer process comprising configuring an antenna array of a terminal device placed in an anechoic chamber for a beam index, obtaining measurement of the radiation pattern produced by the terminal device, determining, based on the obtained measurement, a value for at least one compensation parameter for a full active area of the beam, determining, based on the obtained measurement, another value for the at least one compensation parameter for at least one sub-area of the active area of the beam, and providing the determined values for storing to terminal device being produced.

According to another aspect there is provided a computer program product comprising computer-readable medium bearing computer program code embodied therein for use with a computer, the computer program code comprising code for performing receiving a positioning reference signal request, determining positioning requirements associated with the received positioning reference signal request, determining capabilities of a terminal device, determining an antenna array radiation pattern beam width for a position reference signal based, at least partly on the determined positioning requirements and the determined capabilities of the terminal device, obtaining a value for a compensation parameter based on the determined antenna array radiation pattern beam width, performing beam steering towards a target access node, and performing a timing compensation using the compensation parameter with the obtained value.

According to another aspect there is provided a computer program product comprising computer-readable medium bearing computer program code embodied therein for use with a computer, the computer program code comprising code for performing configuring an antenna array of a terminal device placed in an anechoic chamber for a beam index, obtaining measurement of the radiation pattern produced by the terminal device, determining, based on the obtained measurement, a value for at least one compensation parameter for a full active area of the beam, determining, based on the obtained measurement, another value for the at least one compensation parameter for at least one sub-area of the active area of the beam, and providing the determined values for storing to terminal device being produced.

According to another aspect there is provided a computer program product comprising instructions for causing an apparatus to perform at least the following: receive a positioning reference signal request, determine positioning requirements associated with the received positioning reference signal request, determine capabilities of a terminal device, determine an antenna array radiation pattern beam width for a position reference signal based, at least partly on the determined positioning requirements and the determined capabilities of the terminal device, obtain a value for a compensation parameter based on the determined antenna array radiation pattern beam width, perform beam steering towards a target access node, and perform a timing compensation using the compensation parameter with the obtained value.

According to another aspect there is provided a computer program product comprising instructions for causing an apparatus to perform at least the following: configure an antenna array of a terminal device placed in an anechoic chamber for a beam index, obtain measurement of the radiation pattern produced by the terminal device, determine, based on the obtained measurement, a value for at least one compensation parameter for a full active area of the beam, determine, based on the obtained measurement, another value for the at least one compensation parameter for at least one sub-area of the active area of the beam, and provide the determined values for storing to terminal device being produced.

According to another aspect there is provided a computer program comprising instructions for causing an apparatus to perform at least the following: receive a positioning reference signal request, determine positioning requirements associated with the received positioning reference signal request, determine capabilities of a terminal device, determine an antenna array radiation pattern beam width for a position reference signal based, at least partly on the determined positioning requirements and the determined capabilities of the terminal device, obtain a value for a compensation parameter based on the determined antenna array radiation pattern beam width, perform beam steering towards a target access node, and perform a timing compensation using the compensation parameter with the obtained value.

According to another aspect there is provided a computer program comprising instructions for causing an apparatus to perform at least the following: configure an antenna array of a terminal device placed in an anechoic chamber for a beam index, obtain measurement of the radiation pattern produced by the terminal device, determine, based on the obtained measurement, a value for at least one compensation parameter for a full active area of the beam, determine, based on the obtained measurement, another value for the at least one compensation parameter for at least one sub-area of the active area of the beam, and provide the determined values for storing to terminal device being produced.

According to another aspect there is provided a computer readable medium comprising program instructions for causing an apparatus to perform at least the following: receive a positioning reference signal request, determine positioning requirements associated with the received positioning reference signal request, determine capabilities of a terminal device, determine an antenna array radiation pattern beam width for a position reference signal based, at least partly on the determined positioning requirements and the determined capabilities of the terminal device, obtain a value for a compensation parameter based on the determined antenna array radiation pattern beam width, perform beam steering towards a target access node, and perform a timing compensation using the compensation parameter with the obtained value.

According to another aspect there is provided a computer readable medium comprising program instructions for causing an apparatus to perform at least the following: configure an antenna array of a terminal device placed in an anechoic chamber for a beam index, obtain measurement of the radiation pattern produced by the terminal device, determine, based on the obtained measurement, a value for at least one compensation parameter for a full active area of the beam, determine, based on the obtained measurement, another value for the at least one compensation parameter for at least one sub-area of the active area of the beam, and provide the determined values for storing to terminal device being produced.

According to another aspect there is provided a non-transitory computer readable medium comprising program instructions for causing an apparatus to perform at least the following: receive a positioning reference signal request, determine positioning requirements associated with the received positioning reference signal request, determine capabilities of a terminal device, determine an antenna array radiation pattern beam width for a position reference signal based, at least partly on the determined positioning requirements and the determined capabilities of the terminal device, obtain a value for a compensation parameter based on the determined antenna array radiation pattern beam width, perform beam steering towards a target access node, and perform a timing compensation using the compensation parameter with the obtained value.

According to another aspect there is provided a non-transitory computer readable medium comprising program instructions for causing an apparatus to perform at least the following: configure an antenna array of a terminal device placed in an anechoic chamber for a beam index, obtain measurement of the radiation pattern produced by the terminal device, determine, based on the obtained measurement, a value for at least one compensation parameter for a full active area of the beam, determine, based on the obtained measurement, another value for the at least one compensation parameter for at least one sub-area of the active area of the beam, and provide the determined values for storing to terminal device being produced.

According to another aspect there is provided a system comprising means for receiving a positioning reference signal request, determining positioning requirements associated with the received positioning reference signal request, determining capabilities of a terminal device, determining an antenna array radiation pattern beam width for a position reference signal based, at least partly on the determined positioning requirements and the determined capabilities of the terminal device, obtaining a value for a compensation parameter based on the determined antenna array radiation pattern beam width, performing beam steering towards a target access node, and performing a timing compensation using the compensation parameter with the obtained value.

According to another aspect there is provided a system comprising means for configuring an antenna array of a terminal device placed in an anechoic chamber for a beam index, obtaining measurement of the radiation pattern produced by the terminal device, determining, based on the obtained measurement, a value for at least one compensation parameter for a full active area of the beam, determining, based on the obtained measurement, another value for the at least one compensation parameter for at least one sub-area of the active area of the beam, and providing the determined values for storing to terminal device being produced.

LIST OF DRAWINGS (TO BE COMPLETED)

In the following, the invention will be described in greater detail with reference to the embodiments and the accompanying drawings, in which FIG. 1 illustrates an exemplary embodiment of a radio access network.

FIG. 4 illustrates radiation phase plots.

DESCRIPTION OF EMBODIMENTS

Figure 1:
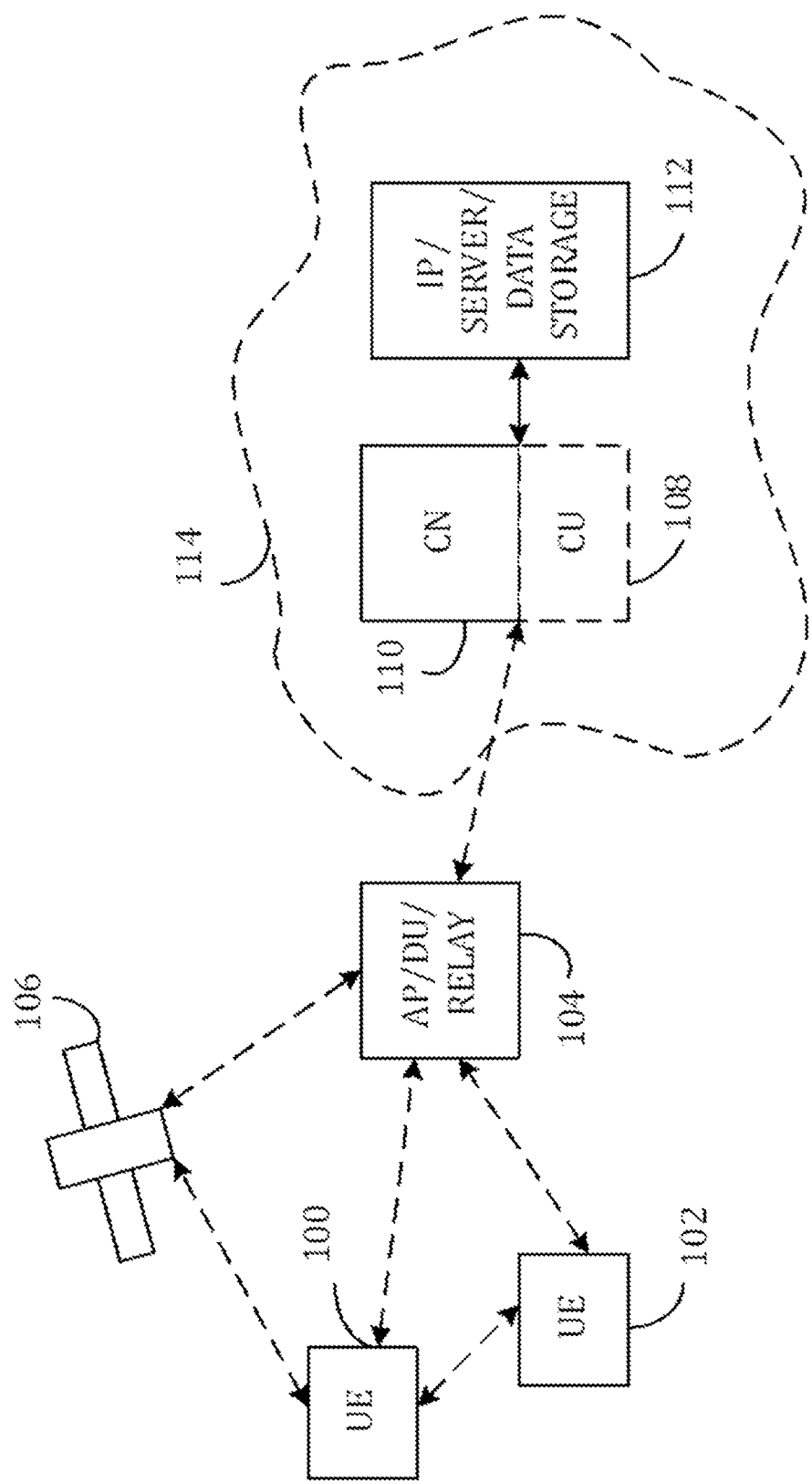

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation may be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (which may also be called as UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a terminal device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers may be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. For example, broadband access may be delivered via HAPS using lightweight, solar-powered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

Location of a terminal device is often a useful and desired information. Various methods may be utilized for obtaining the location. For example, one or more of the following examples may be utilized: Downlink time difference of arrival, DL-TDOA, in which a positioning reference signal, PRS, is utilized for a terminal device to perform downlink reference signal time difference, DL RSTD, measurements for positioning reference signals, PRSs of a plurality of base stations. The measurements are reported to a location server that based on the measurements determines a location of the terminal device. Uplink time difference of arrival, UL-TDOA, in which a sounding reference signal, SRS, is enhanced to allow one or more access nodes to measure an uplink relative time of arrival, UL-RTOA, and report the measurements to a location server that then determines the location of the terminal device based on the reported measurements. Downlink angle-of-departure, DL-AoD, in which a terminal device measures a downlink reference signal receive power, DL RSRP, per beam of a gNB. Measurement reports provided by the terminal device are then used to determine the AoD based on the terminal device's beam location for each gNB. The location server then uses the AoDs to estimate the position of the terminal device. Uplink angle-of-arrival, UL-AOA, in which an access node, such as a gNB, measures the angle-of-arrival based on the beam within which a terminal device is located in. The access node then sends measurement reports to a location server that, based on the received measurement reports, determines the location of the terminal device. Multi-cell round trip time, RTT, in which an access node, such as a gNB, and a terminal device perform Rx-Tx time difference measurement for signals of each cell. The terminal device and the access node then send measurement reports to a location server that based on the measurement reports then determines the round trip time of each cell and derives the position of the terminal device.

Figure 2:
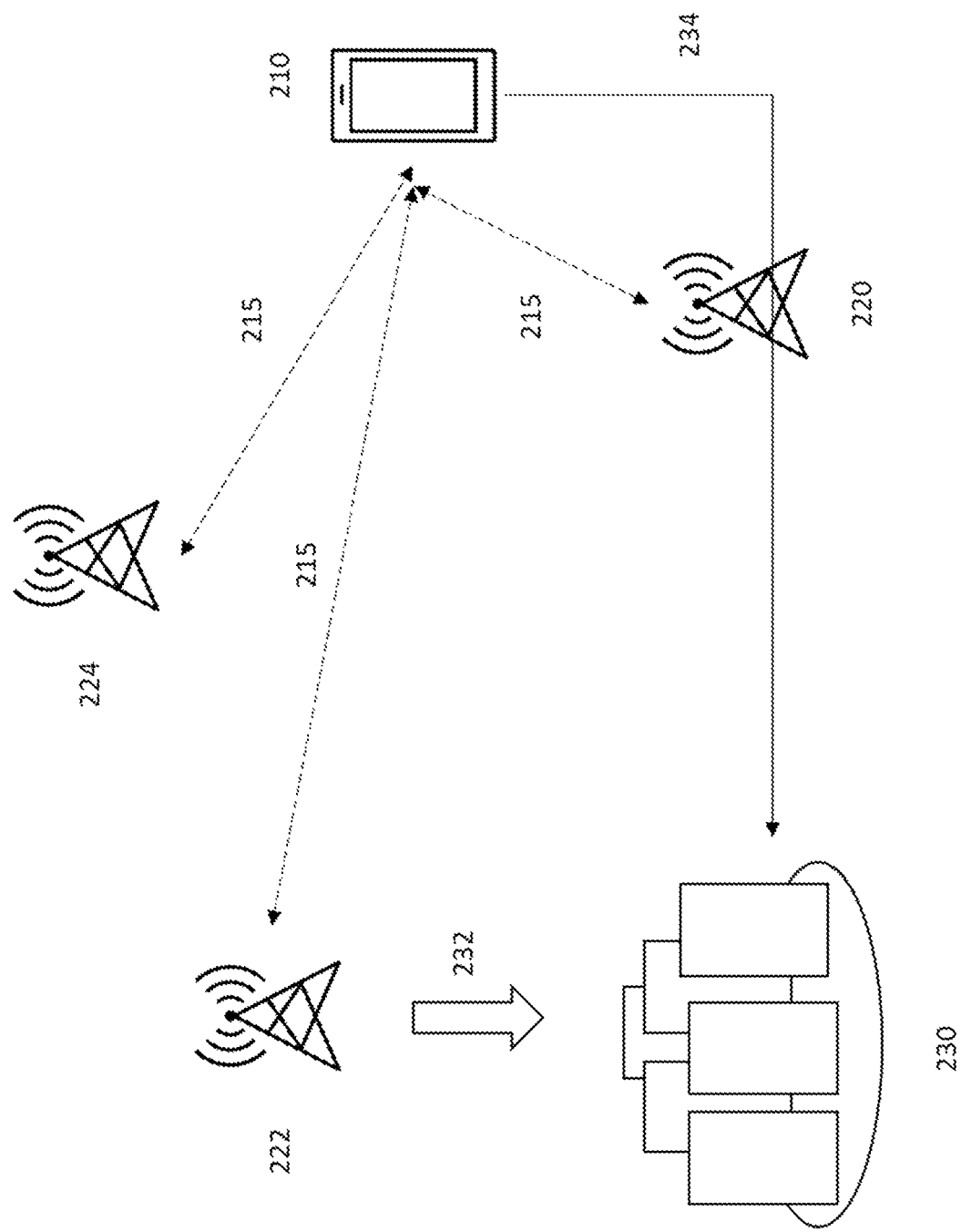
FIG. 2 illustrates an exemplary embodiment of multi-cell round trip time technique.

FIG. 2 illustrates an exemplary embodiment of multi-RTT technique that may be utilized to obtain location of a terminal device 210. In this exemplary embodiment there is a serving access node 220, that in this exemplary embodiment is a gNB. There are also two target access nodes 222 and 224, that in this exemplary embodiment are also gNBs. The access nodes 220, 222 and 224 transmit downlink positioning reference signals, DL PRSs 215, that are then received by the terminal device 210. The terminal device then transmits a sounding reference signal for positioning, SRS-P 215, to the access nodes 220, 222, 224. The terminal device 210 also measures a Rx-Tx time difference for each cell. Additionally, the access nodes 220, 222, 224 measure Rx-Tx time difference for the terminal device 210. The measurement performed by the access nodes 220, 222 and 224 and the measurements performed by the terminal device 210 are reported to a location management function, LMF 230, which then, based on the reported measurements, estimates the RTT to each access node 220, 222 and 224 from the terminal device 210 and may thereby estimate the position of the terminal device 210. The access nodes may utilize new radio positioning protocol a, NRPPa, towards the LMF 230. The terminal device 210 may utilize LTE positioning protocol, LPP, towards the LMF 230. Multi-cell RTT may be advantageous as due to lack of synchronization errors as well as having wide bandwidth available, it may provide high accuracy.

In some exemplary embodiments, the accuracy of the location of a terminal device may be sufficient at sub-meter range. Yet, for example in industrial Internet of Things, IIoT, more precise location may be required. For example, the accuracy of the location of a terminal device may be required to be at the level of 1 cm. If multi-RTT technique is utilized for example to obtain the location of a terminal device, then at the terminal device a precise assessment of the beamformed DL PRS time of arrival, TOA, and the beamformed UL SRS time of departure, TOD, may be required for obtaining accurate multi-cell RTT positioning measurements. To obtain highly accurate TOA/TOD measurements, a precise measure of the physical phase reference position for the signal being received or transmitted via a mmWave antenna array comprised in the terminal device may be required. Yet, the antenna array phase center may not always align with the physical antenna reference point, ARP, but may be located at an offset.

The antenna array phase center location may be dynamic and may be sensitive to for example features of the terminal device. For example, the formfactor design of a terminal device may affect for example current flow by its physical dimensions, mounted proximity components, materials used etc. Also, the antenna array cover e.g. PC-ABS, glass, the antenna array beam steering angle, AoA on the beam pattern for 1 dimensional antenna arrays, which may have a banana-like shape, and/or the polarization at used beam steering angle may further affect the array phase center location. The antenna array phase center may vary dynamically by for example several centimeters. Thus, if the variation is not compensated, it may become an impairment causing a reduction of the position estimation accuracy for centimeter accuracy applications such as IIoT. The reduction of the of the position estimation accuracy may also be understood as degradation of the position estimation accuracy.

Figure 3A:
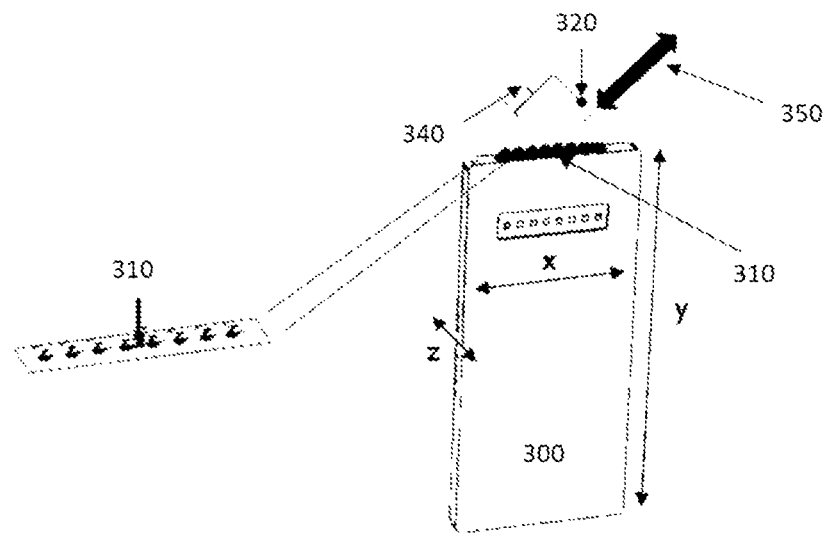
FIG. 3A illustrates an exemplary embodiment of a terminal device and its antenna array.

FIG. 3A illustrates an exemplary embodiment of a terminal device 300 and its antenna array. In this exemplary embodiment the terminal device 300 comprises an antenna array that is a 1×8 mmWave antenna array. The antenna array has an antenna reference point, ARP, 310 for reception and/or transmission of signals. The ARP may be understood to be the physical center point of the antenna array. The phase center of the antenna beam is ideally located at the ARP 310. However, the antenna array phase center may be dynamic and therefore may deviate from the ARP 310. Thus, the deviation may be for example a few centimeters. In such a situation, the location management function may estimate the position of the terminal device 310 assuming that the phase center is at the ARP 310 thereby estimating the location wrong by for example a few centimeters. It is to be noted that in some other exemplary embodiments, the location may be estimated in reference to some other predetermined physical part of the terminal device 300 than the ARP 310 as well. If there is a deviation between the ARP 310 and the antenna array phase center, the estimated location of the terminal device 300 may not be accurate enough in some exemplary embodiments. However, if the deviation is known, the deviation may be compensated for thereby enabling more accurate position estimation. In the exemplary embodiment of FIG. 3A the antenna array phase center 320 is deviated from the ARP 310. The deviation causes the origin of signals to be received and transmitted with a vector offset of 340. Therefore, the TOA and the TOD for signals transmitted and received at the terminal device are to be compensated with 340 to correspond to a situation in which the antenna array phase center was located at the ARP 310.

Figure 3B:
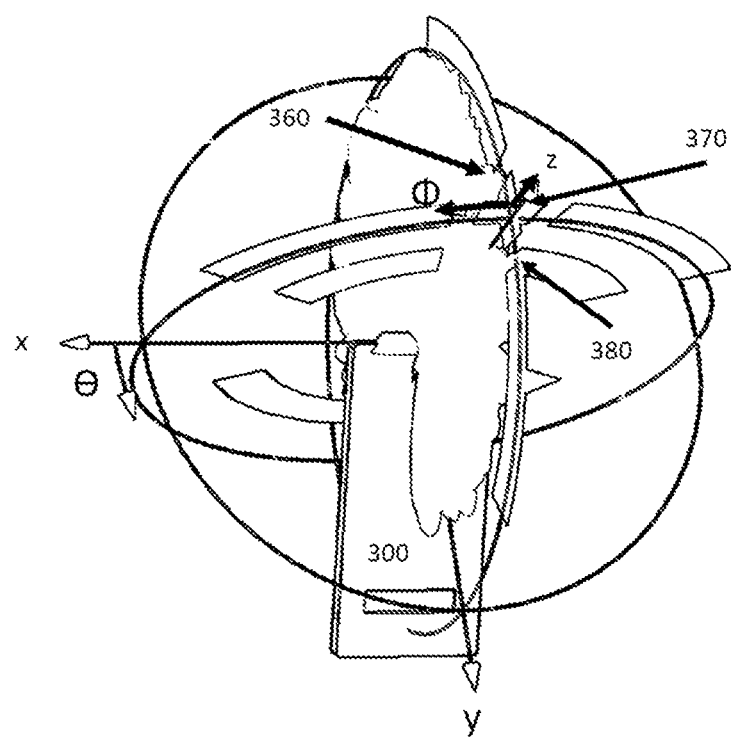
FIG. 3B illustrates simulation results of an exemplary embodiment.

FIG. 3B illustrates simulation results of an exemplary embodiment. In this exemplary embodiment the terminal device 300 comprises the antenna array such that it is mounted on the top of the terminal device 300 with glass and coating. The simulation results illustrate sensitivity of the antenna array phase center to beam steering angle and to angle of arrival and/or departure of signals. In this exemplary embodiment simulations of the antenna array phase center position with reference to the ARP 310 have been conducted for different beam steering angles, for different signal angle of arrival, AOA, for each beam steering angle and for both co- and cross polarization. The phase center is evaluated in the direction of the signal over an area within a 3 dB beam width of the used beam. This is illustrated for the form-factor design of the terminal device 300 for boresight beam configuration and an AOA of 450 indicated by 380. The calculation of the phase center is performed for the co-polarization phase center 370 and for a cross-polarization phase center 360. The simulation results are derived from a 12° evaluation angle, which corresponds at least substantially to the 3 dB beam width of the boresight beams.

FIG. 4 illustrates radiation phase plots for the terminal device 300 that comprises the 1×8 mmWave antenna and the form factor as in the exemplary embodiments of FIGS. 3A and 3B when the antenna array is mounted on top of the terminal device 300. The upper row 422 illustrates the phase plots for co-polarization and the lower row 424 illustrates the phase plots for cross-polarization. The column 412 illustrates a steering angle of −50 degrees, column 414 boresight, and column 416 a steering angle +50 degrees steering angle. As is illustrated by the phase plots the phase change over polarization, steering angle and over the expected shape for each steering angle may be considered as significant. The phase change is illustrated by the shapes within the radiation pattern. The overall shape of the radiation patterns illustrates the power changes. The expected shape may be for example a curve that resembles the shape of a banana.

Figure 5:
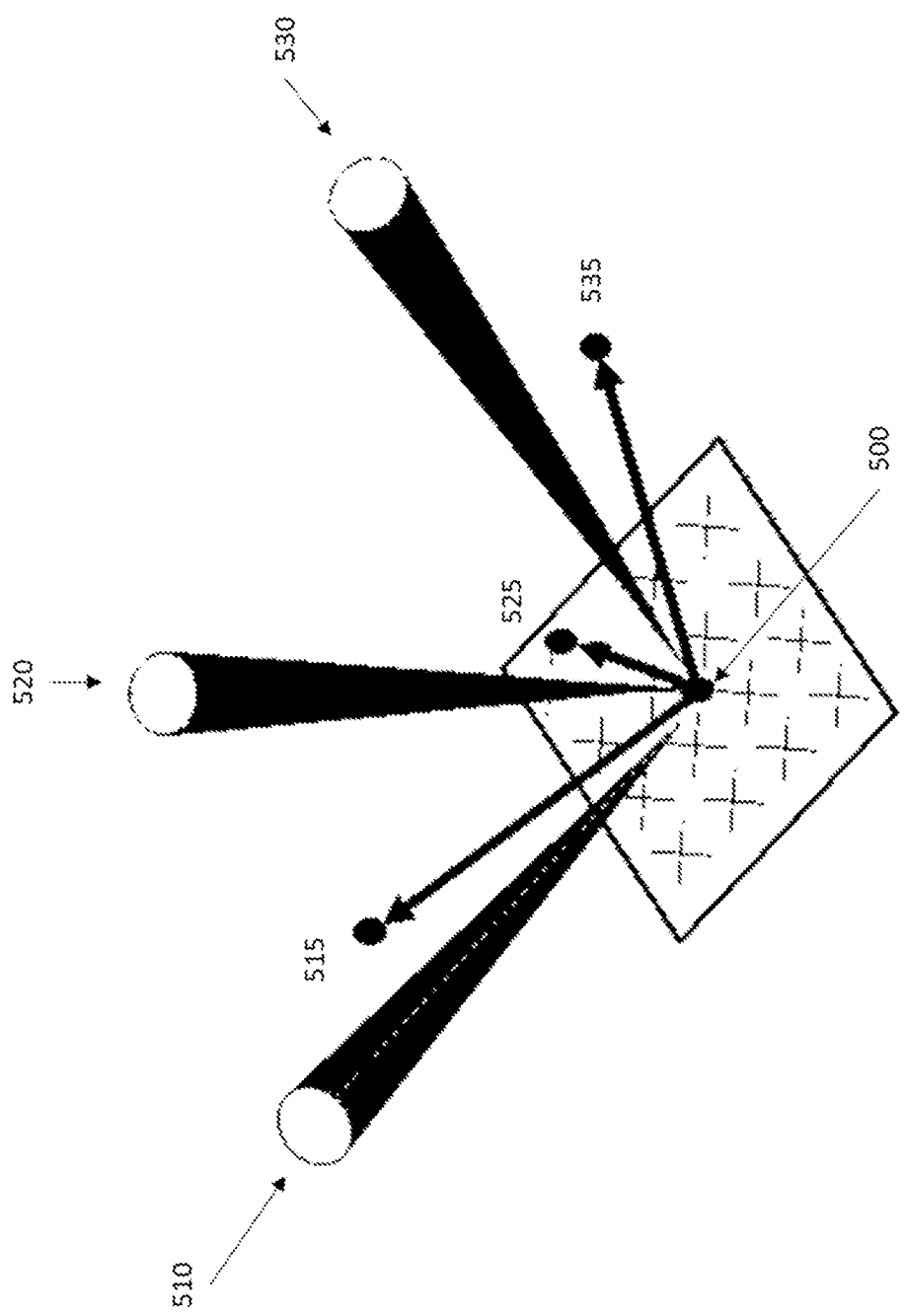
FIG. 5 illustrates an exemplary embodiment of a two-dimensional antenna array.

FIG. 5 illustrates an exemplary embodiment of a two-dimensional antenna array that may be used for example in a terminal device. In this exemplary embodiment, the location of the terminal device is determined in reference to the ARP 500. There are three different signals illustrated in FIG. 5. The first signal has the AOA and/or AOD 510, the second signal has the AOA and/or AOD 520 and the third signal has the AOA and/or AOD 530. The antenna array in this exemplary embodiment is a mmWave antenna array. The antenna phase variation in this exemplary embodiment is considered substantially flat within the beam width of a beamformed transmission or reception at any given frequency. Thus, the phase center position, in this exemplary embodiment, is constant within the width of the beam but changes significant with beam steering angle and polarization. Thus, for any given beam steering angle and polarization a compensation parameter may be defined. The compensation paramenter may allow accurate compensation of the deviation of the phase center from the ARP 500 when determining the location for the terminal device. The compensation parameter may be called angular phase deviation, APD, and it may be determined for a beamformed mmWave antenna array that may be comprised in a terminal device. The APD for the first signal is illustrated as 515, the APD for the second signal is illustrated as 525 and the APD for the third signal is illustrated as 535. For narrow beams the phase may be flat within the beam width. However, in such a case, as the beam is widened, variation may increase. Therefore, another parameter, estimated accuracy, EA, may be associated with each beam APD value, Thus, a compensation parameter APD-EA may be obtained.

If a terminal device comprises a 2-dimensional antenna array, the signal AOA/AOD may be identified based on beam steering direction, i.e. the direction of a selected beam and/or a selected beam index. In such an exemplary embodiment, the terminal device may be characterized in a laboratory to obtain predetermined compensation parameter values for the compensation parameter APD that may then be utilized to compensate for a deviation in the antenna phase center with respect to a physical reference point such as the ARP. The pre-determined values may be stored into a look-up table. It is to be noted that in some exemplary embodiments, instead of or in addition to a look-up table, the values may be utilized to determine a mapping function between an input and an output. The input may comprise for example beam index and/or an antenna array configuration. The output may comprise a determined value for the compensation parameter APD suitable for the given input. The mapping function may then be utilized by the terminal device as a pre-determined mapping function to obtain an output for a given input. To obtain the pre-determined values, the terminal device is characterized such that for each beam pattern and/or configuration that is supported and for each UE antenna array compensation parameters APD and APD-EA are determined over beam index, polarization and other features that are identified as sensitive to the design of the terminal device. Then the values for the compensation parameters APD and APD-EA are determined for each beam index and the determined values are stored for example to a look-up table that may then be loaded to all corresponding terminal devices for example in a production line. In some exemplary embodiments, for wide beam width settings for each beam index further sub-division of APD and APD-EA entries may also be determined and stored as pre-determined compensation parameter values. This may help to support situation in which the terminal device is being used outside the factory and time constraints are applied.

Figure 6:
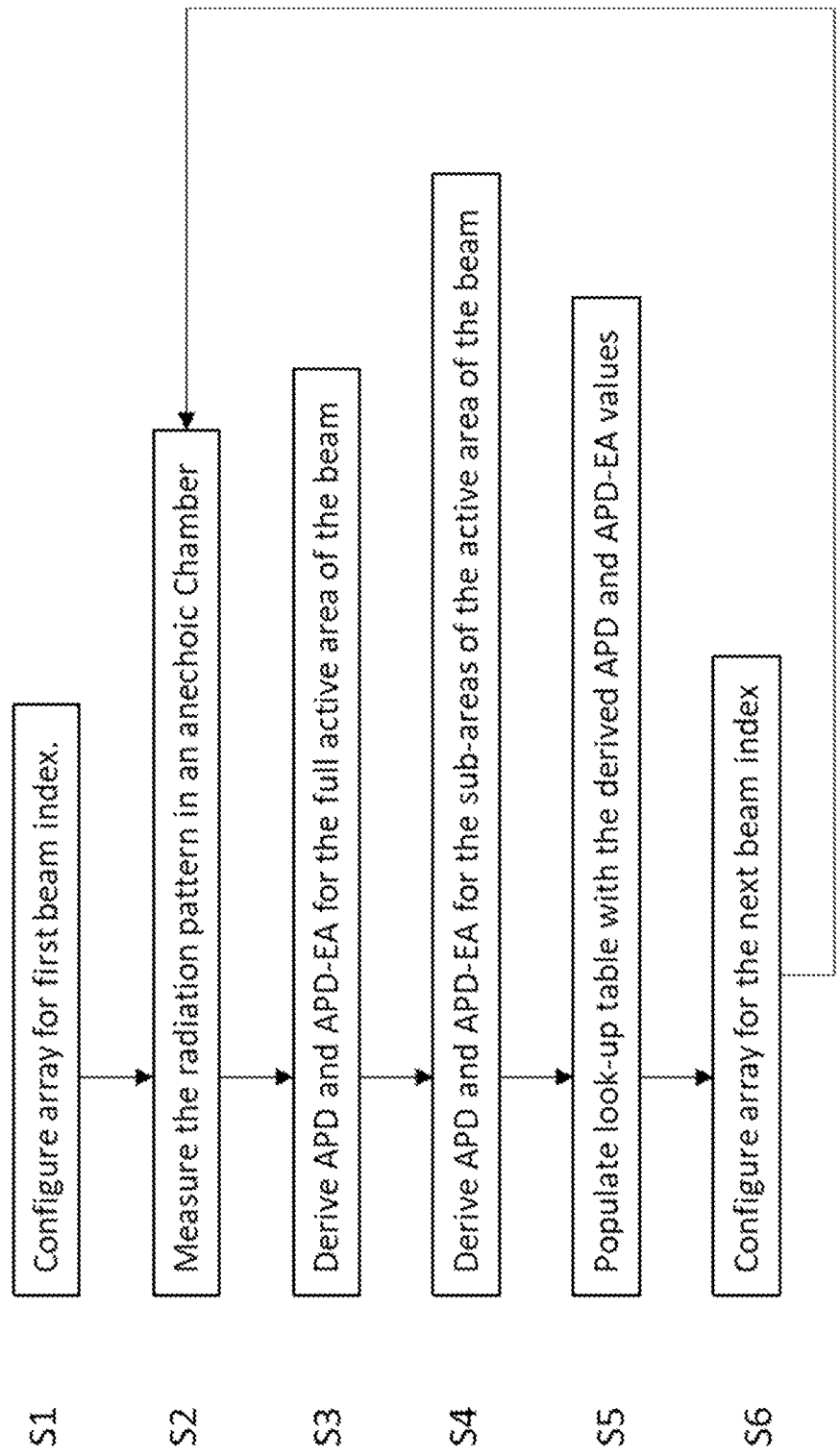
FIG. 6 illustrates a flow chart according to an exemplary embodiment.

FIG. 6 illustrates a flow chart according to an exemplary embodiment in which values for the compensation parameter APD are determined. For determining the compensation parameters, a terminal device may be characterized in a laboratory environment and the determined values may be stored in corresponding terminal devices as pre-determined values. The pre-determined values may be for example in a look-up table. First, in S1 the antenna array is configured according to a first beam index for which the compensation parameter values are to be determined. Then in S2, the radiation pattern produced by the antenna array according to the first beam index is measured. The measuring may be performed in an anechoic chamber with high resolution. Next, in S3, the values corresponding the first beam index are determined for the compensation parameters APD and APD-EA for the full active area of the beam. Next, in S4, the values corresponding the first beam index are determined for the compensation parameters APD and APD-EA for sub-areas of the active area of the beam. Then in S5, the determined values are stored for example to a look-up table. In S6 the array is then configured for the next beam index after which the process returns to S2. The process is repeated for each beam index.

Although the exemplary embodiments described above were discussed in view of a two-dimensional antenna array, in some other exemplary embodiments there may be a one-dimensional antenna array. For a one-dimensional antenna array the compensation parameter APD may be used as well although for a given beam steering, the phase may change over the "banana" shape of the beam. Therefore, for a given accuracy, different APD compensation may be required for different signal directions on the beam, i.e. over angle of arrival, AOA.

As mentioned above, the values for parameters APD and APD-EA, that may be understood as compensation parameters, may be pre-determined and stored to a terminal device, for example, as a look-up table. It is to be noted that in some exemplary embodiments, the values could be determined by the terminal device as needed. In such exemplary embodiments, for each beam steering direction a measured radiation pattern may be stored in the terminal device and, based at least partly on the stored radiation pattern, the value for APD for different antenna array configurations and gNB directions may be determined as needed. However, the needed high resolution and the high number of individual patterns may result in a very large amount of data to be store in the terminal device. Thus, if the compensation parameter values are pre-determined, the required memory allocation in the terminal device may be reduced.

As mentioned above, the terminal device may be characterized in a laboratory, or in some other suitable environment. Characterization may be understood as determining responses of various hardware components comprised a terminal device that are caused, at least partly, by the implementation of the terminal device. The responses may be for example responses to inputs and/or circumstances of an environments surrounding the terminal device. For example, a radiation pattern of each angular steering direction of an antenna beam may be measured at a high resolution, for example, 1 deg, in a 3D far-field measurement set-up such as an anechoic chamber. Depending on whether the physical dimension of the antenna array is one- or two-dimensional, the pre-determined values may be stored in a look-up table in accordance with the antenna array used.

Figure 7:
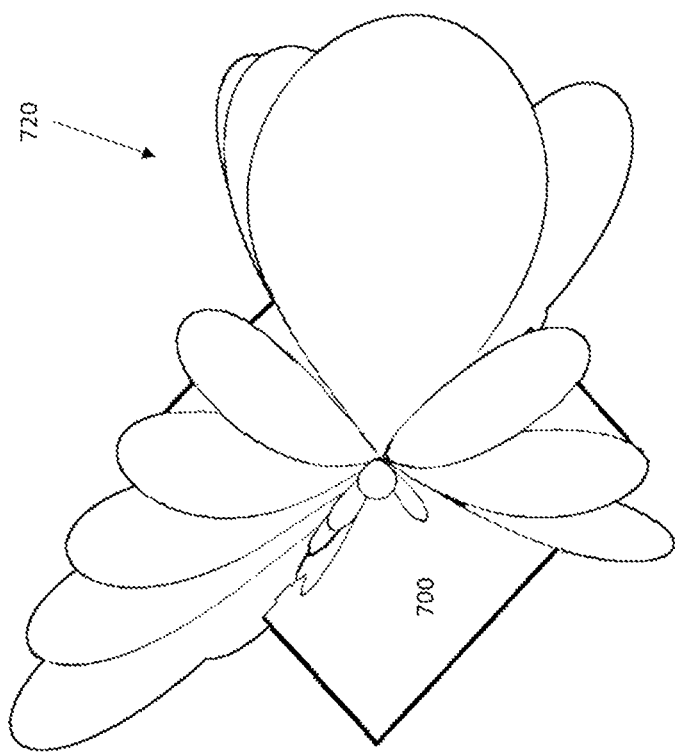
FIG. 7 illustrates an exemplary embodiment of a radiation pattern.
Figure 7:
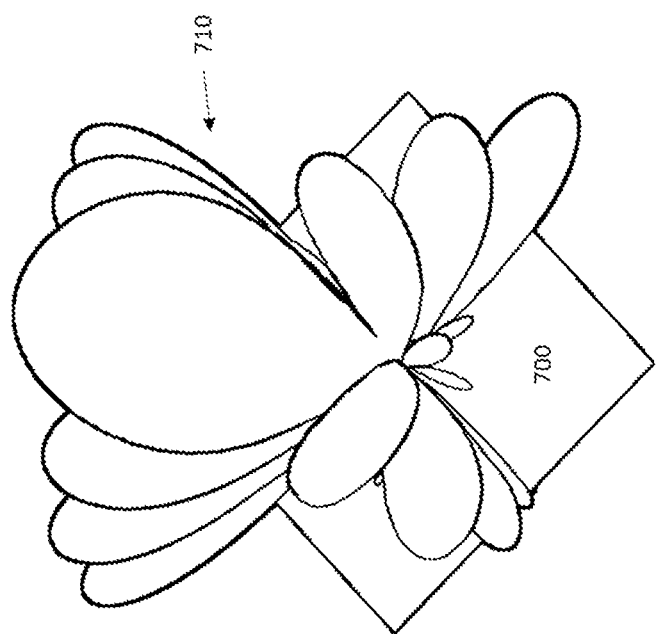

FIG. 7 illustrates an exemplary embodiment in which a radiation pattern is illustrate for a two-dimensional antenna array 700 that may be comprise in a terminal device. The two-dimensional antenna array may be steered in two different angular directions, Phi ($\Phi$) and Theta ($\theta$) independent of each other. FIG. 7 illustrates the radiation pattern for the antenna array 700 for boresight 710 and for an angular direction of $\Phi$ equal to 30° 720. A 3 dB radiation beam width produced by the antenna array 700 is, in this exemplary embodiment, limited in both $\Phi$ and $\theta$ so the angular direction of the incoming and/or outgoing reference signals are thereby also limited to that area on the sphere. The size of the area may depend on the physical size of the array and in, some exemplary embodiments, also on the granularity of the angular beam refinement.

As described above, values for the compensation parameters APD and APD-EA may be determined per beam index and stored to the terminal device for example as a look-up table. The values may be determined based on the high-resolution radiation pattern measurements performed in an anechoic chamber. The determination may be performed for example as described in FIG. 6. The APD and APD-EA may be added to the look-up table for example as illustrated in Table 1 below when the full array is used for transmitting or receiving the positioning signals.

TABLE 1

| Angular beam direction index ($\Phi$, $\Theta$) for full array 8 × 8 | Array configuration | Angular Phase Deviation (APD) | Estimated Accuracy (APD-EA) |
|---|---|---|---|
| ($\Phi$, $\Theta$)#1 | Array weights #1 | APD#1 | APD-EA#1 |
| ($\Phi$, $\Theta$)#2 | Array weights #2 | APD#2 | APD-EA#2 |
| ($\Phi$, $\Theta$)#n | Array weights #n | APD#n | APD-EA#n |

In some exemplary embodiments, the terminal device may also determine to use a wider radiation beam for positioning reference signals towards one or more gNBs by activating a sub-portion of the antenna array. This may be for example due to time constraints. The sub-portion of the antenna array may be the only activated portion of the antenna array as well. In such exemplary embodiments, the angular direction, AD, of the one or more gNBs might still be known from prior full utilization of the array, for example from data communication, and that information may be used together with the wider beam for position reference signals, PRSs, to reduce the area for APD estimation thereby increasing the accuracy. This is illustrated in Table 2 below. In the table, the index #sub included in the last three columns of the table, is for such exemplary embodiments in which the angular direction of the full array is not known and the APD is estimated from the full radiation beam width of the sub array configuration.

TABLE 2

| Angular beam direction index ($\Phi$, $\Theta$) for sub array 4 × 4 | Array configuration | Full Array Angular Direction (AD) | Angular Phase Deviation (APD) | Estimated Accuracy (APD-EA) |
|---|---|---|---|---|
| 2($\Phi$, $\Theta$)#1 | Array weights #1 | AD#1 | APD#1(AD#1) | APD-EA#1(AD#1) |
|  |  | AD#2 | APD#1(AD#2) | APD-EA#1(AD#2) |
|  |  | AD#m | APD#1(AD#m) | APD-EA#1(AD#m) |
|  |  | AD#sub | APD#1(AD#sub) | APD-EA#1(AD#sub) |
| ($\Phi$, $\Theta$)#2 | Array weights #2 | AD#1 | APD#2(AD#1) | APD-EA#2(AD#1) |
|  |  | AD#2 | APD#2(AD#2) | APD-EA#2(AD#2) |
|  |  | AD#m | APD#2(AD#m) | APD-EA#2(AD#m) |
|  |  | AD#sub | APD#2(AD#sub) | APD-EA#2(AD#sub) |
| ($\Phi$, $\Theta$)#n | Array weights #n | AD#1 | APD#n(AD#1) | APD-EA#n(AD#1) |
|  |  | AD#2 | APD#n(AD#2) | APD-EA#n(AD#2) |
|  |  | AD#m | APD#n(AD#m) | APD-EA#n(AD#m) |
|  |  | AD#sub | APD#n(AD#sub) | APD-EA#2(AD#sub) |

It is to be noted that the values for the compensation parameter APD may also be determined and stored for 2×2, single element operation or any other sub-array configurations depending of the specific implementation of the terminal device and may also be expanded accordingly. Additionally, the table may be repeated for two used polarizations and other parameters such as frequency, signal bandwidth, temperature etc.

In exemplary embodiments in which the terminal device comprises a one-dimensional antenna array, the antenna may be steered in one of the angular direction of Phi ($\Phi$) or Theta ($\theta$) but not in both angular directions. In such exemplary embodiments, the 3 dB radiation beam width limits $\Phi$, while $\theta$ covers a large angular area, for example over 180°. Therefore, the angular direction of the received and/or transmitted signal may not be well defined thereby causing the estimation of APD less accurate compared to if the full 3 dB beam width area is used. Yet, the values for the compensation parameter APD for smaller portions of $\theta$ may be determined and stored for example by adding them to a look-up table as illustrated in column 3 to 5 of Table 3 below. The one-dimensional array may further be divided into sub-array configuration for wider radiation beam operations and, additionally, the table may be repeated for the two used polarizations and other sensitive parameters such as frequency, signal bandwidth, temperature etc. Table 3 may further comprise a #sub index for the full beam when the angular direction of the in/out-coming signal is not known.

TABLE 3

| Angular beam direction index (Φ) | Array configuration | Angular beam direction index (Θ) | Angular Phase Deviation (APD) | Estimated Accuracy (APD-EA) |
|---|---|---|---|---|
| Φ#1 | Array weights #1 | Θ#1 | APD#1(Θ#1) | APD-EA#1(Θ#1) |
|  |  | Θ#2 | APD#1(Θ#2) | APD-EA#1(Θ#2) |
|  |  | Θ#m | APD#1(Θ#m) | APD-EA#1(Θ#m) |
| Φ#2 | Array weights #2 | Θ#1 | APD#2(Θ#1) | APD-EA#2(Θ#1) |
|  |  | Θ#2 | APD#2(Θ#2) | APD-EA#2(Θ#2) |
|  |  | Θ#m | APD#2(Θ#m) | APD-EA#2(Θ#m) |
| Φ#n | Array weights #n | Θ#1 | APD#n(Θ#1) | APD-EA#n(Θ#1) |
|  |  | Θ#2 | APD#n(Θ#2) | APD-EA#n(Θ#2) |
|  |  | Θ#m | APD#n(Θ#m) | APD-EA#n(Θ#m) |

As a terminal device receives or transmits PRSs, it may utilize antenna array configurations that differ from those utilized for data communication. The antenna array configuration utilized for receiving or transmitting a PRS may depend on one or more factors applicable at the time the PRS is to be received or transmitted. Such factors may comprise for example accuracy of positioning that is required, the number of access nodes, that may be gNBs, the terminal device is to communicate with and if that number is known or not and the angular direction of the gNBs and if that is known by the terminal device, channel coherence time, is that known and are measurements to be simultaneously or sequential, number of needed samples per measurement for average factor, type of an array and size of an array, granularity of phase shifters and the numbers of arrays to be used by the terminal device.

In some exemplary embodiments, values for the estimated accuracy compensation parameter APD-EA may be smaller for array beam configurations with a narrow radiation beam width compared to a wide beam width provided that it is correctly aligned with the access nodes. However, the terminal device may not know the precise angular direction of the access nodes or it may have to perform PRS transmission or reception simultaneously with wider radiation beams due to a short channel coherence time caused for example by rapid changes in the environment, such as high speed of the terminal device or rotation.

Figure 8:
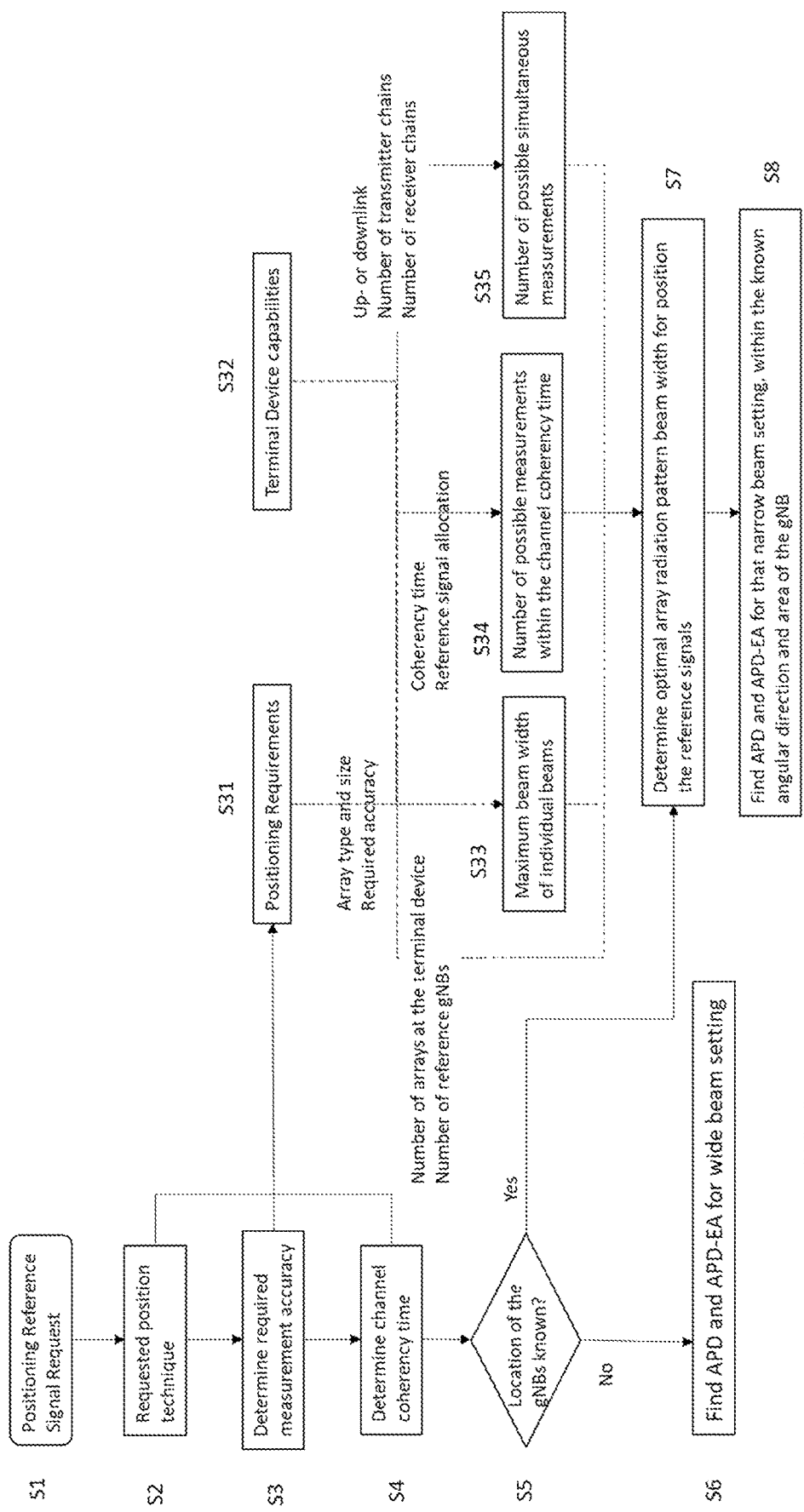
FIG. 8 illustrates an exemplary embodiment of obtaining values for compensation parameters.

FIG. 8 illustrates an exemplary embodiment of a procedure for determining the optimum array configurations obtaining highest antenna array phase offset compensation accuracy under given dynamic operating conditions of a terminal device. In S1 the terminal device first obtains a positioning reference signal request. After this, in S2, the requested position technique is determined. This may be an uplink or downlink position technique. Then in S3, required measurement accuracy is determined and in S4 channel coherency time is determined. In S5 it is then determined if locations of the access nodes, that may be gNBs are known. If not, then in S6 values for the compensation parameters APD and APD-EA are determined according to a wide beam setting. If the locations of the access nodes are known, then in S7 an optimal antenna array radiation pattern beam width is determined for PRSs. Finally, in S8 values for the compensation parameters APD and APD-EA corresponding to the determined pattern beam width within an angular direction and area for the access node are obtained. The values are pre-determined, and the obtaining may be performed by retrieving the values from a memory, for example from a look-up table.

The positioning requirements S31 may comprise determining one or more factors such as the factors described above. Also, the capabilities of the terminal device S32 may be determined. Such capabilities may comprise for example a number of antenna arrays comprised in the terminal device, an array type and size, number of transmitter chains and/or number of receiver chains. The positioning requirements S31 and the capabilities of the terminal device S32 may be comprised as part of one or more of the steps S2, S3 and S4. In S33, based on the determined array size and type and required accuracy, a maximum beam width of individual beams may be determined. In S34 based on coherency time and reference signal allocation, a number of possible measurements within the channel coherency time may be determined. In S35, based on whether the PRS is uplink or downlink, number of transmitter chains and number of receiver chains a number of possible simultaneous measurements are determined. S33, S34 and S35 together with number of antenna arrays comprised in the terminal device and number of reference access nodes may be taken into account in S7.

In general, in a radio resource control, RRC, connected mode a terminal device may receive a positioning measurement request and the terminal device may then configure a suitable DL beam pattern for each target access node, such as gNB, connection. In DL, based on the chosen beam pattern and beam index the terminal device may obtain from the stored pre-determined values a corresponding APD value and consequently correct the TOA for the received PRS. In UL, the terminal device may assume UL and DL beam correspondence and thereby determine that the beam pattern and beam index are the same as in DL and the UE SRS-P TOD may be compensated by the associated APD value for the selected UL polarization. Further, if more than one antenna panel of the terminal device are capable of seeing the same access node, then TOA may be determined as an average of the measurements compensated by APD values obtained in a panel specific manner and weighted by the accuracy APD-EA.

Figure 9:
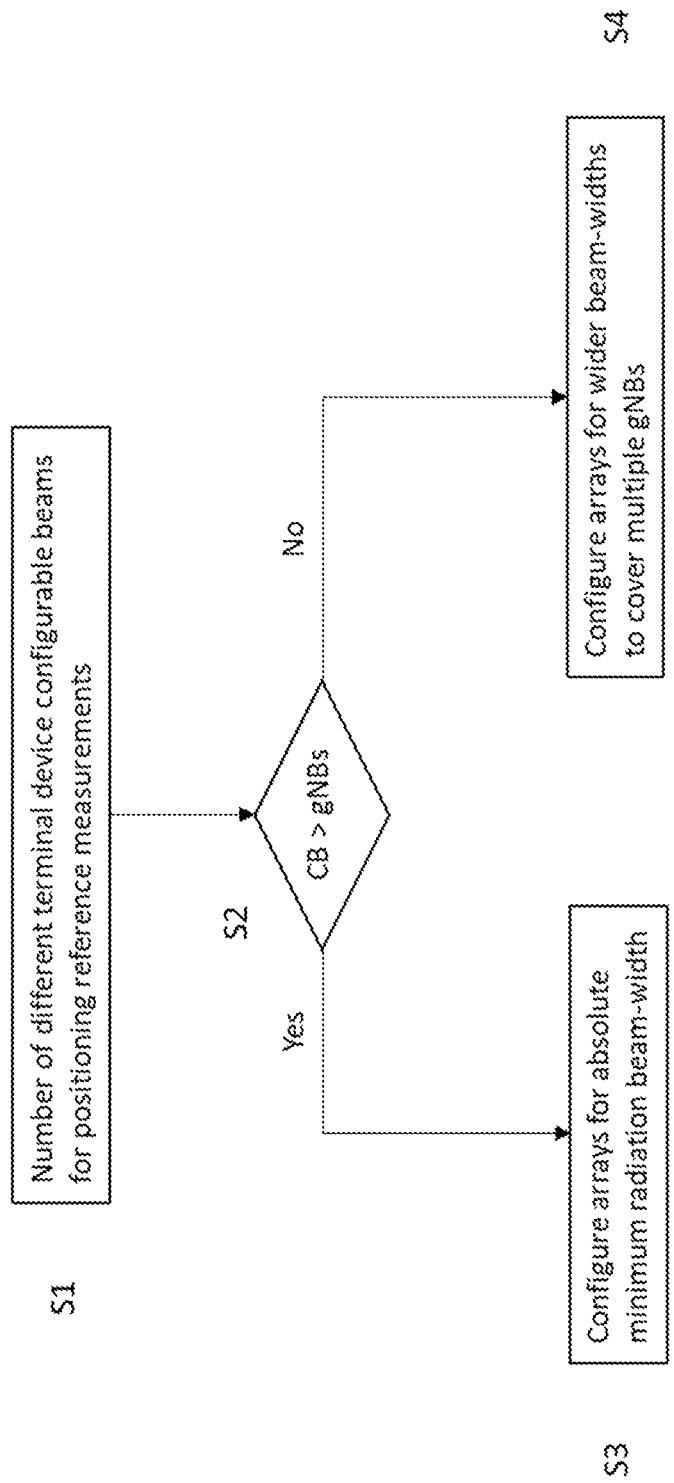
FIG. 9 illustrates an exemplary embodiment of a decision process for determining an optimal radiation beam width.

FIG. 9 illustrates an exemplary embodiment of a decision process for determining an optimal radiation beam width. The optimum beam configuration for a terminal device for transmitting or receiving PRSs for positioning may depend on multiple factors as highlighted above and the obtained accuracy may depend on the capabilities of the terminal device and on the conditions of the channel. First, in S1 Number of different configurable beams in the terminal device for positioning reference measurements is determined. The determination may be performed using the following equation CB=MCCT*SM/AvgF, wherein SM is the number of simultaneous measurements, MCCT is the possible measurements within the channel coherence time, AvgF is the average factor per position reference measurement and CB is the number of configurable beams. Next, in S2, it is determined if the CB is larger than the number of target access nodes that may be gNBs. If the answer is yes, then in S3 antenna arrays are configured for absolute minimum radiation beam-width. If the answer is no, then some antenna arrays are configured for wider beam-widths to cover multiple access nodes. A look-up table comprised in the terminal device may comprise pre-determined values for compensation parameters APD and APD-AE entries per:

configured angular beam steering direction, configured radiation beam width, angular directions within the different configured beams, array polarizations and other sensitive parameters, such as frequency, signal bandwidth, temperature etc.

Figure 10:
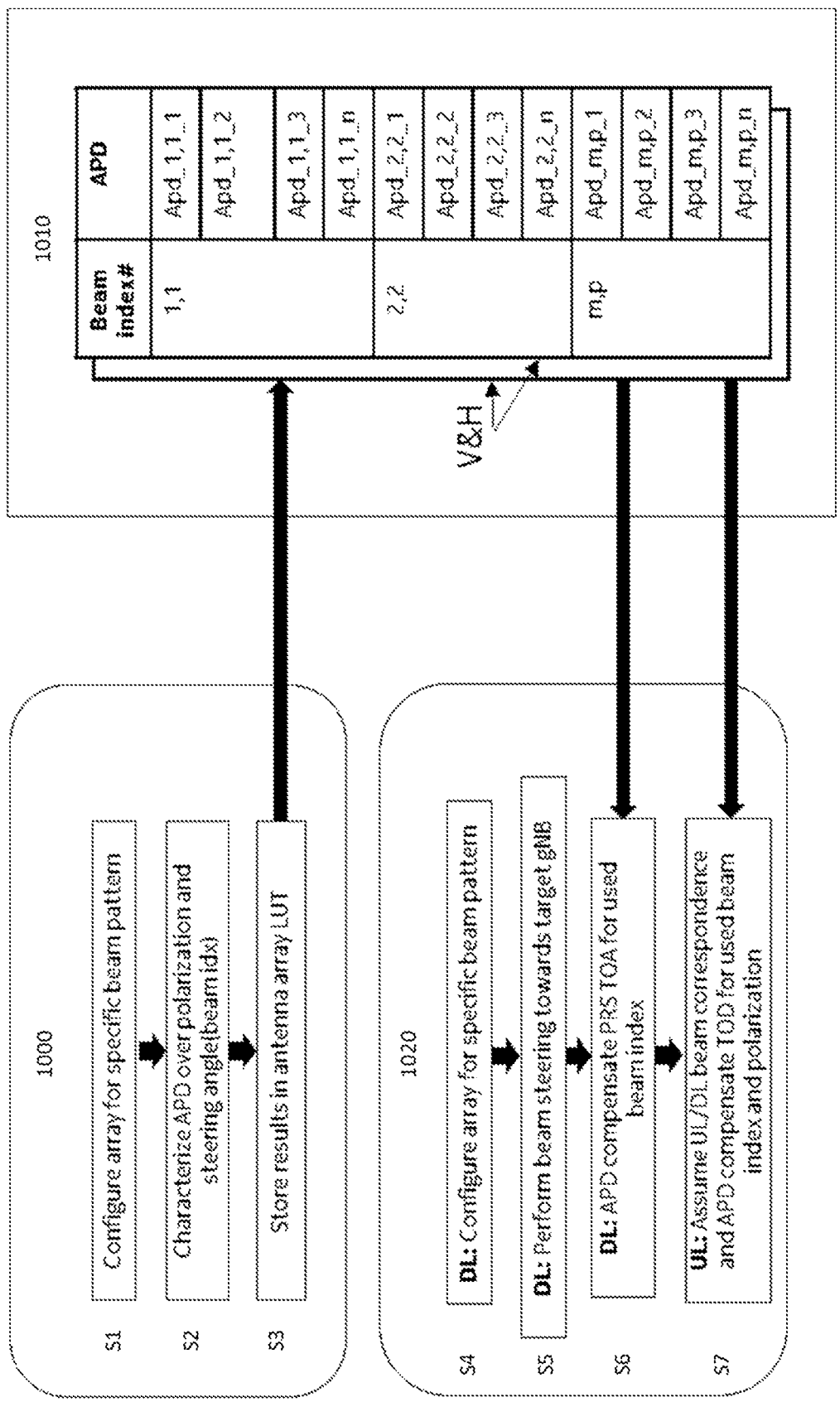
FIG. 10 and FIG. 11 illustrate exemplary embodiments of characterising a terminal device.

FIG. 10 illustrates an exemplary embodiment comprising characterising the terminal device 1000, storing the pre-determined values for the compensation parameters to a look-up table 1010 and the terminal device then using the look-up table 1020. The pre-determined values for the compensation parameters may be utilized for beamformed TOA and/or TOD. In this exemplary embodiment, the terminal device comprises a two-dimensional antenna array. The characterization of the terminal device 1010 comprises first, in S1, sequentially configuring the terminal device for a specific beam pattern supported in the field. Next, in S2, compensation parameters APD and APD-EA are characterized over beam index, polarization and other parameters identified as sensitive for a design of the terminal device. The parameters identified as sensitive may comprise for example frequency, bandwidth and/or temperature.

Once the values for the parameters are determined, they may be stored to a look-up table as illustrated in S3. Thus, the look-up table 1010 may be populated with the measured APD and APD-EA values and characterization returns to next supported beam pattern until the look-up table is populated for all beam patterns. Once the look-up table is filled, it is loaded into the terminal device and all corresponding terminal devices in a production line.

The terminal device may then, when deployed in the field, utilize the loaded look-up table as illustrated in the process flow 1020. When the terminal device is in an RRC connected mode, it may receive a positioning measurement request. Thus, in S4, the terminal device then configures for a given DL beam pattern suitable for one or more target access node connections. The beam configuration may be selected for example as illustrated in FIG. 8. In some exemplary embodiments, additionally, local sensors of the terminal device may be used for example to warn if antenna loading may impact accuracy, i.e. compromising the far field radiation pattern. In such an exemplary embodiment, the terminal device may decide to use another antenna panel that is also capable of reaching the target access node but at lower APD-EA accuracy. Then in S5 the terminal device performs DL beam steering towards the one or more target access nodes. Next, in S6 a DL value for APD is determined from the look-up table based on the obtained beam pattern, beam index and optionally other parameters such as frequency, bandwidth, temp, etc. The obtained APD value may now be utilized to compensate the TOA for received PRS. In some exemplary embodiments, MIMO may be utilized for DL. In such an exemplary embodiment, various manners of compensating dual polarization reception may be utilized. For example, both DL polarizations may be captured, and each polarization may be individually compensated. Alternatively, both DL polarizations may be captured and compensated with an offset for highest energy polarization. Further alternatively, sequential SISO for DL PRS measurements may be utilized if link budget allows such an option to be utilized. Finally, in S7, in UL, the terminal device may assume beam correspondence between UL and DL. The beam pattern and look-up table index are then determined to be the same and the UE SRS TOD is compensated by the APD value for that look-up table entry for the used UL polarization.

Figure 11:
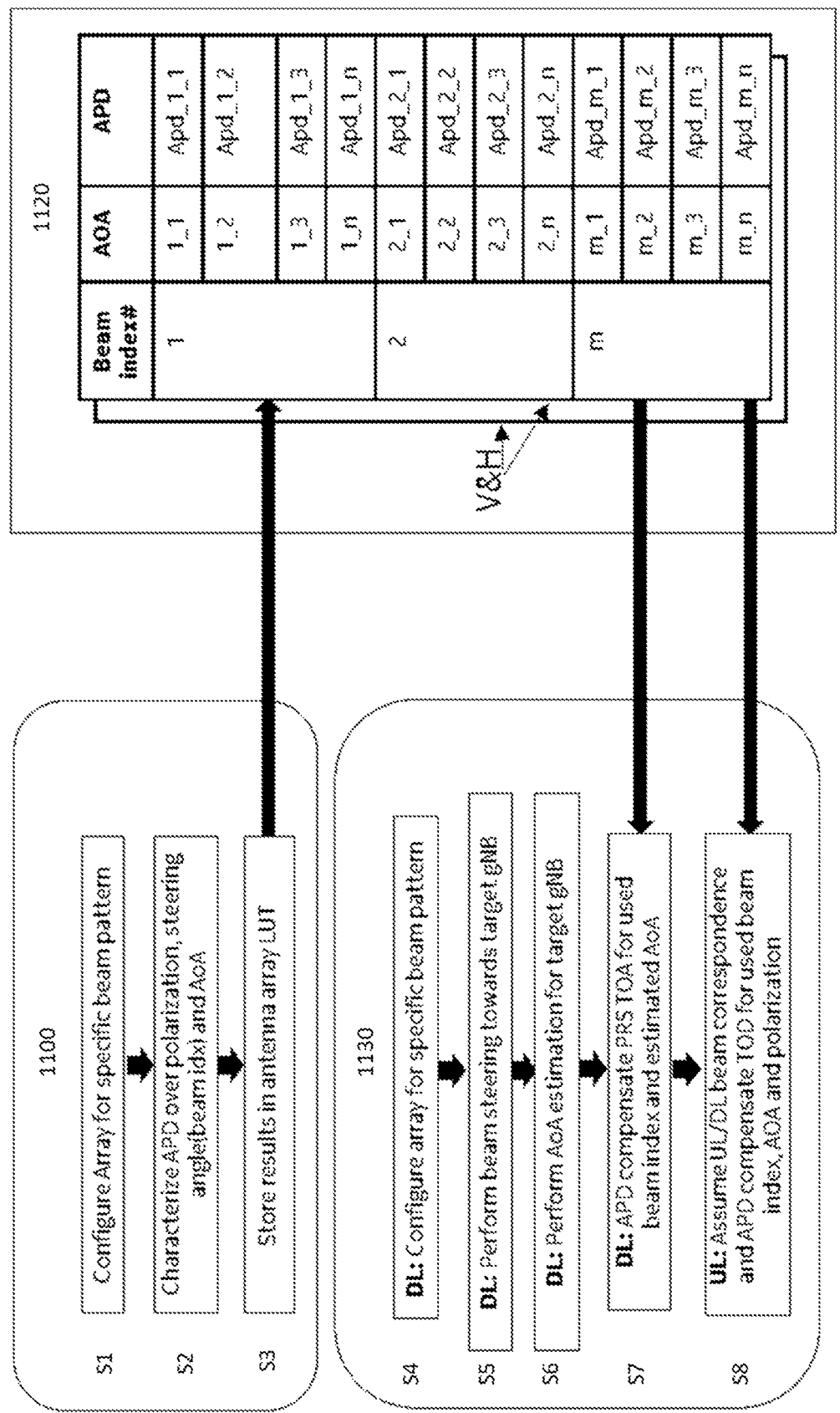

FIG. 11 illustrates an exemplary embodiment comprising characterising the terminal device 1100, storing the pre-determined values for the compensation parameters to a look-up table 1120 and the terminal device then using the look-up table 1130. The pre-determined values for the compensation parameters may be utilized for beamformed TOA and/or TOD. In this exemplary embodiment, the terminal device comprises a one-dimensional antenna array.

First, in S1, the terminal device is sequentially configured for a specific beam pattern supported in the field. The values for the compensation parameters APD and APD-EA are characterized in S2 over beam index, AOA, polarization and other parameters identified as sensitive for the specific implementation of the terminal device such as frequency, bandwidth, temperature, etc. Then in S3 a look-up table 1120 is populated with the determined values for the compensation parameters APD and APD-EA. The process described by S1, S2 and S3 is repeated such that it is performed for each of the supported beam patterns until the look-up table is populated for all the supported beam patterns. The populated look-up table is then loaded into the terminal device and to corresponding terminal devices in a production line.

The terminal device may then, when deployed in the field, utilize the loaded look-up table as illustrated in the process flow 1130. When the terminal device is in an RRC connected mode, it may receive a positioning measurement request. Thus in S4, the terminal device then configures a suitable beam pattern for a given DL for one or more target access node connections. The beam configuration may be determined for example according to the exemplary embodiment of FIG. 8. In some exemplary embodiments, additionally, local sensors of the terminal device may be used for example to warn if antenna loading may impact accuracy, i.e. compromising the far field radiation pattern. In such an exemplary embodiment, the terminal device may decide to use another antenna panel that is also capable of reaching the target access node but at lower APD-EA accuracy. Then, is S5, the terminal device performs DL beam steering towards the one or more target access nodes. Next, in S6, the terminal device performs an AOA estimation for the one or more target access nodes. In S7 then the terminal device may, for DL determine, based on the obtained beam pattern, beam index, estimated AoA and optional other parameters, such as frequency, bandwidth, temp, etc, the corresponding APD value from the look-up table and compensate the TOA for received PRS. In some exemplary embodiments, MIMO may be utilized for DL. In such an exemplary embodiment, various manners of compensating dual polarization reception may be utilized. For example, both DL polarizations may be captured, and each polarization may be individually compensated. Alternatively, both DL polarizations may be captured and compensated with an offset for highest energy polarization. Further alternatively, sequential SISO for DL PRS measurements may be utilized if link budget allows such an option to be utilized. Then in S8, for UL, the terminal device may assume beam correspondence between UL and DL. The beam pattern and look-up table index are then determined to be the same and the UE SRS TOD is compensated by the APD value for that LUT entry for the used UL polarization.

Figure 12A:
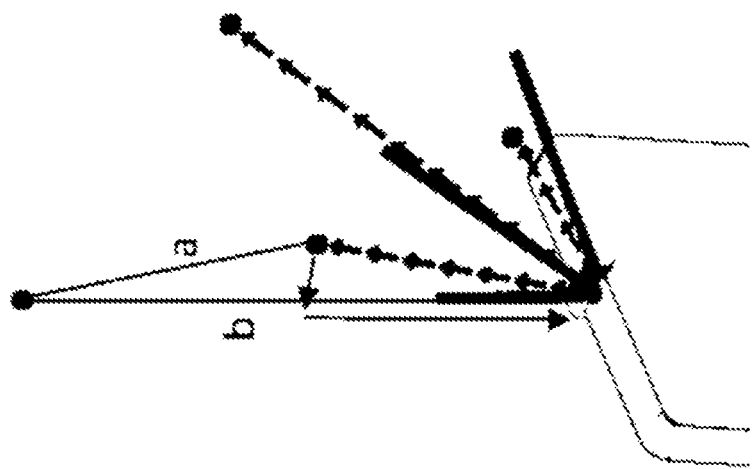
FIGS. 12A and 12B illustrate exemplary embodiments of determining timing compensation.
Figure 12A:
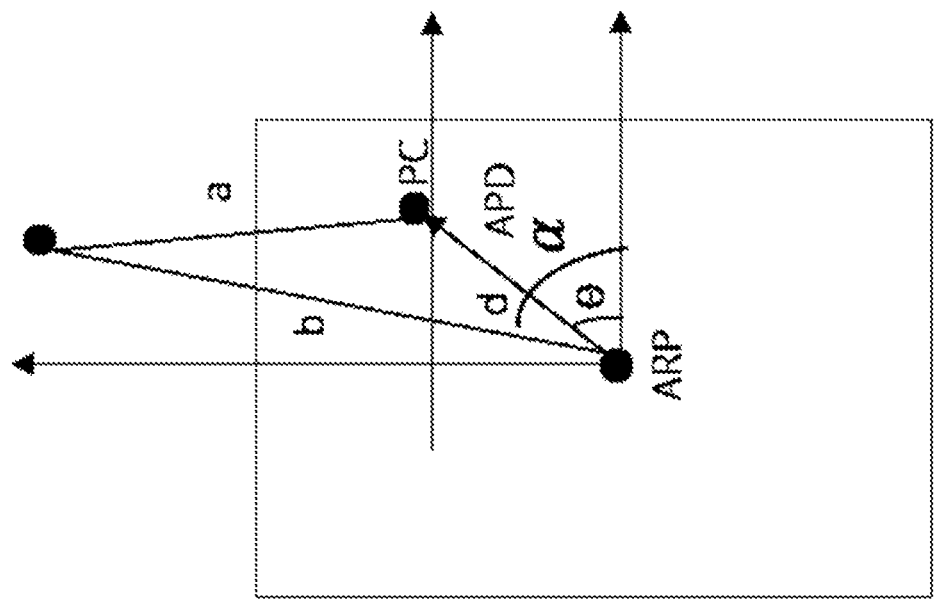
Figure 12B:
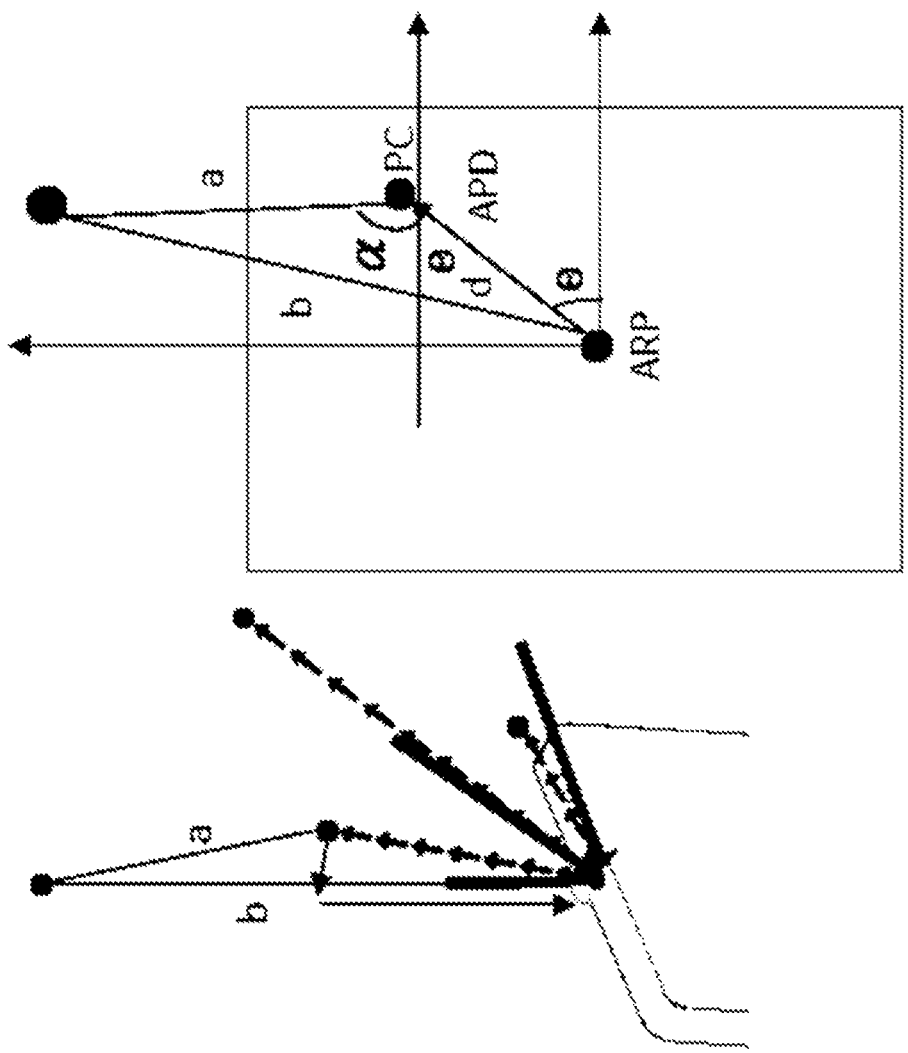

FIG. 12 A illustrates how to determine TOA and/or TOD compensation, in other words timing compensation, based on AoA and APD when the AoA reference is the ARP. This is the case for example for two-dimensional antenna arrays in which AoA corresponds to the beam direction and for one-dimensional antenna arrays where the AoA estimation has been conducted with antenna configurations having phase center close to the ARP. In this exemplary embodiment PC is the Phase Center, APD is the distance d at an angle θ. TOA ta corresponding to distance a and AoA α are measured. Based on these the TOA tb corresponding to distance b may be determined as a solution to the equation $b^2-2bd\cos(\alpha-\theta)-(a^2-d^2)=0$ and a=c*ta. Then $$tb = \frac{b}{c}.$$

FIG. 12 B illustrates how to determine TOA and/or TOD compensation based on AoA and APD when the AoA reference is the APD. This is the case for example for one-dimensional antenna arrays in which the configuration used for receiving PRS and/or transmitting SRS-P is the same as used for an AOA estimation. In this exemplary embodiment PC is the phase center, APD is the distance d at an angle θ. TOA ta corresponding to distance a and AoA α are measured. Based on these the TOA tb corresponding to distance b may be determined as a solution to the equation $b=\sqrt{a^2+d^2-2ad\cos(\alpha+\theta)}$ and a=c*ta. Then $$tb = \frac{b}{c}.$$

In an exemplary embodiment if more than one antenna panel comprised in the terminal device may see the same gNB, then TOA may be calculated as an average of the measurements compensated by panel specific APD values and weighted by the accuracy APD-EA. For example, the terminal device may receive gNB_1 on antenna panel A and panel B. Both antenna panels have been characterised and the predetermined values for the compensation parameters are stored in a look-up table that is then stored to the terminal device. The received signal may be received with different beam index and/or AOA on the two panels. As such the APD and associated accuracy APD-EA are different for the reception on antenna panel A and antenna panel B. In this exemplary embodiment, TOA_A may be estimated on panel A compensated by APD_A and TOA_B may be estimated on panel B compensated by APD_B. To account for the panel specific accuracy the TOA from gNB_1 may be determined as the weighted average of TOA_A and TOA_B with APD_EA_A and APR_EA_B used as weights. This exemplary embodiment may enhance the accuracy of the positioning measurement and may require that the two antenna panels A and B may receive the desired gNB DL signal in parallel, i.e. the beam sweeping areas for the two antennas are partially overlapping.

The exemplary embodiments described above may have an advantage of enabling position estimation accuracy improvement for beamformed mmWave UE applications requiring for example cm accuracy. Without APD compensation the antenna array phase offset related inaccuracy alone may exceed the requirements for cm accuracy applications such as IIoT.

Figure 13:
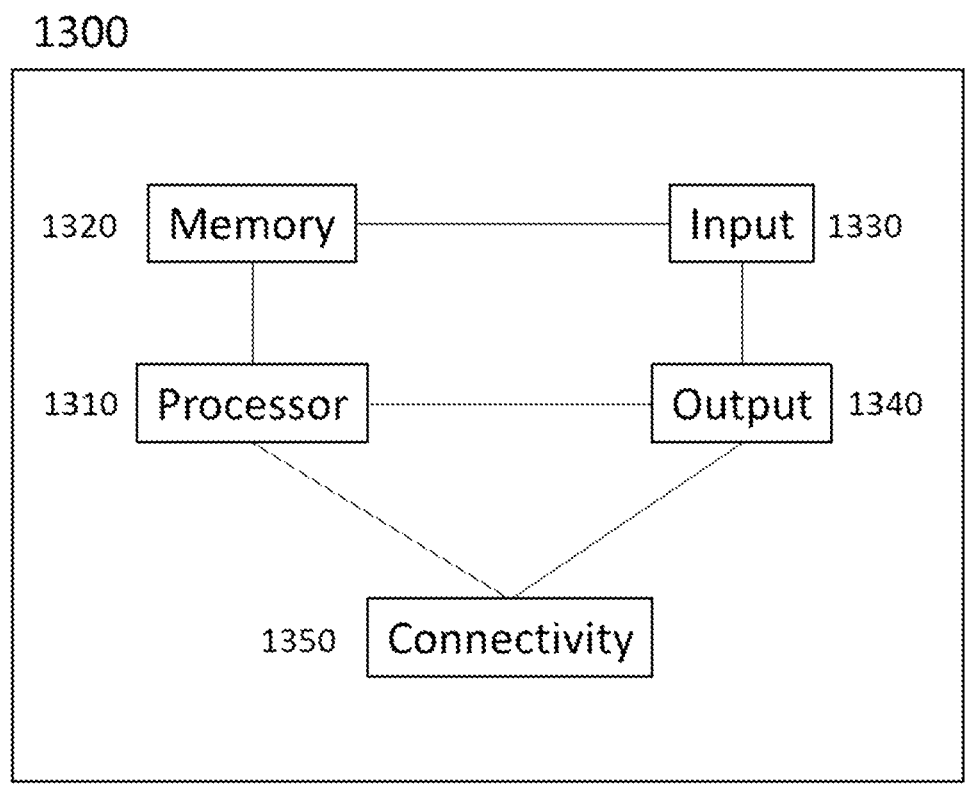
FIG. 13 illustrates an exemplary embodiment of an apparatus.

FIG. 13 illustrates an exemplary embodiment of an apparatus that may be, or may be comprised in, a terminal device, according to an example embodiment. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application specific integrated circuits, ASICs.

The processor 1310 is coupled to a memory 1320. The processor is configured to read and write data to and from the memory 1320. The memory 1320 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1320 stores computer readable instructions that are execute by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via electromagnetic carrier signal and/or may be copied from a physical entity such as computer program product. Execution of the computer readable instructions causes the apparatus 1300 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 1300 further comprises, or is connected to, an input unit 1330. The input unit 1330 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 1330 may comprise an interface to which external devices may connect to.

The apparatus 1300 also comprises an output unit 1340. The output unit comprises or is connected to one or more displays capable of rendering visual content such as a light emitting diode, LED, display, a liquid crystal display, LCD and a liquid crystal on silicon, LCoS, display. The output unit 1340 may comprise two displays to render stereoscopic visual content. One display to render content to the left eye and the other display to render content to the right eye. The output unit 1340 may further comprise a transmission unit, such as one or more waveguides or one or more lenses, to transfer the rendered visual content to the user's field of view. The output unit 1340 further comprises one or more audio outputs. The one or more audio outputs may be for example loudspeakers or a set of headphones.

The apparatus 1300 may further comprise a connectivity unit 1350. The connectivity unit 1350 enables wired and/or wireless connectivity to external networks. The connectivity unit 1350 may comprise one or more antennas and one or more receivers that may be integrated to the apparatus 1300 or the apparatus 1300 may be connected to. The connectivity unit 1350 may comprise an integrated circuit or a set of integrated circuits that provide the wireless communication capability for the apparatus 1300. Alternatively, the wireless connectivity may be a hardwired application specific integrated circuit, ASIC.

It is to be noted that the apparatus 1300 may further comprise various component not illustrated in the FIG. 13. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory storing instructions that, when executed by the at least one processor, cause the apparatus at least to:
    receive a positioning reference signal request;
    determine positioning requirements associated with the received positioning reference signal request;
    determine capabilities of a terminal device;
    determine an antenna array radiation pattern beam width for a position reference signal based, at least partly on the determined positioning requirements and the determined capabilities of the terminal device;
    obtain a value for a compensation parameter based on the determined antenna array radiation pattern beam width;
    perform beam steering towards a target access node; and
    perform a timing compensation using the compensation parameter with the obtained value.

2. An apparatus according to claim 1, wherein obtaining the value for the compensation parameter is further based on the apparatus being further caused to perform an angle of arrival estimation for the target access node.

3. An apparatus according to claim 1, wherein the value for the compensation parameter is obtained from a look-up table stored in the terminal device.

4. An apparatus according to claim 1, wherein the value for the compensation parameter is obtained by utilizing a determined mapping function between an input and a corresponding output.

5. An apparatus according to claim 4, wherein the input comprises at least one of the following: a beam index and/or an antenna array configuration; and wherein the output comprises the value for the compensation parameter.

6. An apparatus according to claim 1, wherein the value for the compensation parameter is obtained by calculating it based on radiation patterns stored in the terminal device.

7. An apparatus according to claim 1, wherein the apparatus is further caused to compensate a time of arrival of a position reference signal based on the obtained pre-determined value for the compensation parameter.

8. An apparatus according to claim 1, wherein the apparatus is further caused to compensate a time of departure of a position reference signal based on the obtained pre-determined value for the compensation parameter.

9. An apparatus according to claim 1, wherein the apparatus is further caused to obtain another pre-determined value for another compensation parameter.

10. An apparatus according to claim 1, wherein the positioning requirements comprise one or more of the following: measurement accuracy, positioning technique, channel coherency time and/or number of target access nodes.

11. An apparatus according to claim 1, wherein the capabilities of a terminal device comprise one or more of the following: number of antenna arrays comprised in the terminal device, an antenna array type, an antenna array size, a number of transmitter chains and/or a number of receiver chains.

12. An apparatus according to claim 1, wherein the terminal device comprises at least one of the following: a one-dimensional antenna array and/or two-dimensional antenna array.

13. An apparatus according to claim 1, wherein the apparatus is the terminal device.

14. A method comprising:
    receiving a positioning reference signal request;
    determining positioning requirements associated with the received positioning reference signal request;
    determining capabilities of a terminal device;
    determining an antenna array radiation pattern beam width for a position reference signal based, at least partly on the determined positioning requirements and the determined capabilities of the terminal device;
    obtaining a value for a compensation parameter based on the determined antenna array radiation pattern beam width;
    performing beam steering towards a target access node; and
    performing a timing compensation using the compensation parameter with the obtained value.

15. A method according to claim 14, wherein obtaining the value for the compensation parameter is further based on the method being further caused to perform an angle of arrival estimation for the target access node.

16. A method according to claim 14, wherein the value for the compensation parameter is obtained from a look-up table stored in the terminal device.

17. A method according to claim 14, wherein the value for the compensation parameter is obtained by utilizing a determined mapping function between an input and a corresponding output.

18. A method according to claim 17, wherein the input comprises at least one of the following: a beam index and/or an antenna array configuration; and wherein the output comprises the value for the compensation parameter.

19. A method according to claim 14, wherein the value for the compensation parameter is obtained by calculating it based on radiation patterns stored in the terminal device.

20. A non-transitory computer readable medium comprising program instructions that, when executed by an apparatus, cause the apparatus to perform at least the following:
    receive a positioning reference signal request;
    determine positioning requirements associated with the received positioning reference signal request;
    determine capabilities of a terminal device;
    determine an antenna array radiation pattern beam width for a position reference signal based, at least partly on the determined positioning requirements and the determined capabilities of the terminal device;
    obtain a value for a compensation parameter based on the determined antenna array radiation pattern beam width;
    perform beam steering towards a target access node; and
    perform a timing compensation using the compensation parameter with the obtained value.

\* \* \* \* \*